United States Patent [19]

Kondo et al.

[11] Patent Number: 5,110,559
[45] Date of Patent: May 5, 1992

[54] HYDROGEN GENERATING APPARATUS

[75] Inventors: Yumihito Kondo, Ibaraki; Yoshiaki Amamo, Tsuchiura; Shinjiro Kimura, Ushiku; Susumu Horiuchi, Mito, all of Japan

[73] Assignee: Hitachi, Ltd., Tokyo, Japan

[21] Appl. No.: 544,381

[22] Filed: Jun. 27, 1990

[30] Foreign Application Priority Data

Jun. 29, 1989 [JP] Japan .................................. 1-165211

[51] Int. Cl.$^5$ .................. G05D 23/00; B01J 7/00; B01J 12/00
[52] U.S. Cl. .................. 422/109; 48/127.9; 422/114; 422/190; 422/201; 422/204
[58] Field of Search ............... 422/190, 204, 201, 202, 422/200, 109, 114; 48/127.9; 423/652, 653, 654, 656, 655

[56] References Cited

U.S. PATENT DOCUMENTS

| | | | |
|---|---|---|---|
| 1,959,101 | 5/1934 | Beekley | 423/652 |
| 2,135,694 | 11/1938 | Bardwell et al. | 423/652 |
| 2,289,922 | 7/1942 | Mekler | 422/190 |
| 2,304,138 | 12/1942 | Barnes et al. | 422/190 |
| 2,937,077 | 5/1960 | Faatz et al. | 423/654 |
| 3,810,975 | 5/1974 | Brooke | 423/653 |
| 3,988,425 | 10/1976 | Jockel et al. | 423/653 |
| 4,162,290 | 7/1979 | Crawford et al. | 422/190 |
| 4,552,741 | 11/1985 | Melchior | 422/190 |
| 4,553,981 | 11/1980 | Fuderer | 423/652 |
| 4,822,521 | 4/1989 | Fuderer | 423/652 |
| 4,830,834 | 5/1989 | Stahl et al. | 422/190 |
| 4,963,339 | 10/1990 | Krishnamurthy et al. | 422/190 |
| 4,976,747 | 12/1990 | Szydlowski et al. | 422/190 |
| 4,985,231 | 1/1991 | Lywood | 423/654 |
| 4,994,331 | 2/1991 | Cohen | 423/652 |

*Primary Examiner*—Peter Kratz
*Attorney, Agent, or Firm*—Antonelli, Terry, Stout & Kraus

[57] ABSTRACT

A hydrogen generating apparatus has, at least, a material gas supply system, steam generator, an air supply system, a reforming system including a reformer and a shift converter each incorporating a catalyst, a product hydrogen transporting system, and a reformer combustion gas exhaust system. The apparatus is characterized by further having a shift converter jacket surrounding the catalyst of said shift converter, a branch pipe branching from said reformer combustion gas exhaust system and leading to said shift converter jacket, and a change-over valve provided at a portion of said reformer combustion gas exhaust system where said branch pipes branches off said reformer combustion gas exhaust system. During the start-up of the apparatus, the combustion gas exhausted from the reformer is introduced into the shift converter jacket to heat the shift converter thereby realizing a quick start-up, i.e., temperature rise, of the reformer system.

18 Claims, 7 Drawing Sheets

HYDROGEN GENERATING APPARATUS

BACKGROUND OF THE INVENTION

The present invention relates to a hydrogen generating apparatus and, more particularly, to a hydrogen generating apparatus which is suitable for use as an on-site type hydrogen generating system, an industrial fuel battery system and so forth.

In general, a hydrogen generating apparatus has, in order to generate a hydrogen rich gas through a steam-reforming of a material such as hydrocarbon ($CH_4$) or alcohol, a reformer and a CO converter (referred to as "shift converter", hereinafter) which respectively incorporate catalysts. Usually, a desulfurization reactor is provided in a material gas supplying system of the apparatus.

The reforming reaction is expressed by the following formula:

$$CH_4 + 2H_2O \rightarrow 4H_2 + CO_2$$

wherein the reaction in the reformer and the reaction in the shift converter are respectively expressed by the following formulae (1) and (2).

$$CH_4 + H_2O \rightarrow CO + 3H_2 \qquad (1)$$

$$CO + H_2O \rightarrow H_2 + CO_2 \qquad (2)$$

In the conventional hydrogen generating apparatus, an inert gas heated in a reformer is made to flow through a process flow path so as to raise temperatures of the shift converter and the heat exchangers which are downstream from the reformer. On the other hand, the desulfurization reactor, which is disposed upstream of the reformer, is heated by a heater.

This type of hydrogen generating apparatus is shown in, for example, "Future Prospect of Phosphate-type Fuel Battery Power Generating Technique, Report No. 2", Agency of Industrial Science and Technology, Ministry of International Trade and Industry, page 4.2-5 to 4.2-7, January 1986.

In the known technique described above, no specific consideration is given to the time for heating up the shift converter. The time required for heating the shift converter to a temperature for activating the catalyst is a very important factor which rules the start-up time of the reforming system. Hitherto, a considerably long time is required for starting up the reforming system.

SUMMARY OF THE INVENTION

Accordingly, an object of the present invention is to provide a hydrogen generating apparatus in which the rate of heating up the shift converter or the rate of heating up the desulfurization reactor is increased to shorten the time for starting up the whole system, thereby overcoming the above-described problems of the prior art.

To this end, according to one aspect of the present invention, there is provided a hydrogen generating apparatus having, at least, a material gas supply system, steam generating means, an air supply system, a reforming system including a reformer and a shift converter each incorporating a catalyst, a product hydrogen transporting system, and a reformer combustion gas exhaust system, the apparatus comprising: a shift converter jacket surrounding the catalyst of the shift converter; a branch pipe branching from the reformer combustion gas exhaust system and leading to the shift converter jacket; and a change-over valve provided at a portion of the reformer combustion gas exhaust system where the branch pipe branches off the reformer combustion gas exhaust system and capable of selectively switching the passage of the combustion gas from the reformer between the main exhaust line and the branch pipe.

According to another aspect of the present invention, there is provided a hydrogen generating apparatus having, at least, a material gas supply system including a desulfurization reactor incorporating a catalyst, steam generating means, an air supply system, a reforming system including a reformer incorporating a catalyst, a product hydrogen transporting system, and a reformer combustion gas exhaust system, the apparatus comprising: a desulfurization reactor jacket surrounding the catalyst of the desulfurization reactor; a branch pipe branching from the reformer combustion gas exhaust system and leading to the desulfurization reactor jacket; and a change-over valve provided at a portion of the reformer combustion gas exhaust system where the branch pipe branches off the reformer combustion gas exhaust system and capable of selectively switching the passage of the combustion gas from the reformer between the main exhaust line and the branch pipe.

Thus, according to the invention, the reformer combustion gas, the temperature of which rises quicker than the inert gas which flows through the process gas passage during the start-up and which flows at a greater flow rate than the inert gas, is introduced into the jacket of the shift converter or the desulfurization reactor through the branch pipe. The change-over valve provided at the branching portion of the reformer combustion gas exhaust system is opened by the dynamic pressure of the purging air which is supplied at the maximum rate prior to the ignition so as to purge any residual gas from the reformer furnace. The valve is then closed by an actuator which serves to urge the valve to the closing position at a predetermined temperature when the rise of the temperature of the reformer gas is substantially saturated after the reformer is thermally stabilized.

In operation, the flow rate of the reformer combustion air is maximized in the furnace purging which is conducted prior to ignition. The reformer combustion air at a high flow rate generates a pressure which generates a force by which the change-over valve on the branching point on the reformer combustion gas pipe is opened. Since this valve does not close until a set temperature is reached, the combustion gas is continuously supplied into the shift converter jacket from the branching point until the reformer is thermally stabilized to cause a saturation in the rise of the combustion gas temperature after the ignition. The combustion gas flowing through the shift converter jacket effectively heats the shift converter so that the heating of the shift converter is promoted to shorten the start-up time as compared with the case where the shift converter is heated up solely by the inert gas heated by the reformer and circulated through the process gas passage.

The shift converter is heated to a sufficiently high temperature by the time when the reformer is thermally stabilized. When such a state is realized, therefore, it is necessary to close the change-over valve in order to avoid any reduction in the CO conversion rate due to excessive temperature rise of the shift converter. The change-over valve, which is actuated by the mechanism operable to close this valve when a predetermined temperature is reached, is therefore closed since the temperature of the combustion gas also has been raised by this time to reach the above-mentioned predetermined temperature.

The high-temperature change-over valve used in the present invention does not have any operating portion such as a valve rod and other parts which projects externally from the valve box and, therefore, does not have any movable sealing portion unlike ordinary valves. In general, it is extremely difficult to seal a projecting movable part such as a valve rod in an environment of a high temperature. The omission of such movable seal, therefore, eliminates such difficulty and contributes to an improvement in the reliability.

Combustion gas exhausted from the reformer is the best heat-recovery heat source in so-called on-site hydrogen generating apparatus directly connected to a plant or in industrial fuel batteries, because of quick start-up, high temperature and large flow rate of this gas. In most cases, this gas is used for the purpose of pre-heating of the combustion air or super-heating of reforming steam. According to the invention, from the view point of shortening the start-up time, this gas is used for heating up the shift converter and the desulfurization reactor having large heat capacities so as to promote the heating up of these components, thus eliminating the necessity for an electric heater which hitherto has been necessary for attaining the same purpose, thus saving both installation cost and energy.

When the shift converter and the desulfurization reactor have been heated up to predetermined temperatures, i.e., once the steady running is commenced, heat is sufficiently recovered by combustion air and reforming steam. The outlet of the shift converter jacket may be connected to an inlet of a heat recovery heat exchanger in which the heat is exchanged between the gas and the combustion air or the reforming steam. With such an arrangement, it is possible to make an efficient use of the portion of the waste heat which could not be utilized in heating up the shift converter at the time of start up of the system.

DESCRIPTION OF THE PREFERRED EMBODIMENTS

Preferred embodiments of the present invention will be described with reference to FIGS. 1 to 9.

Figure 1:
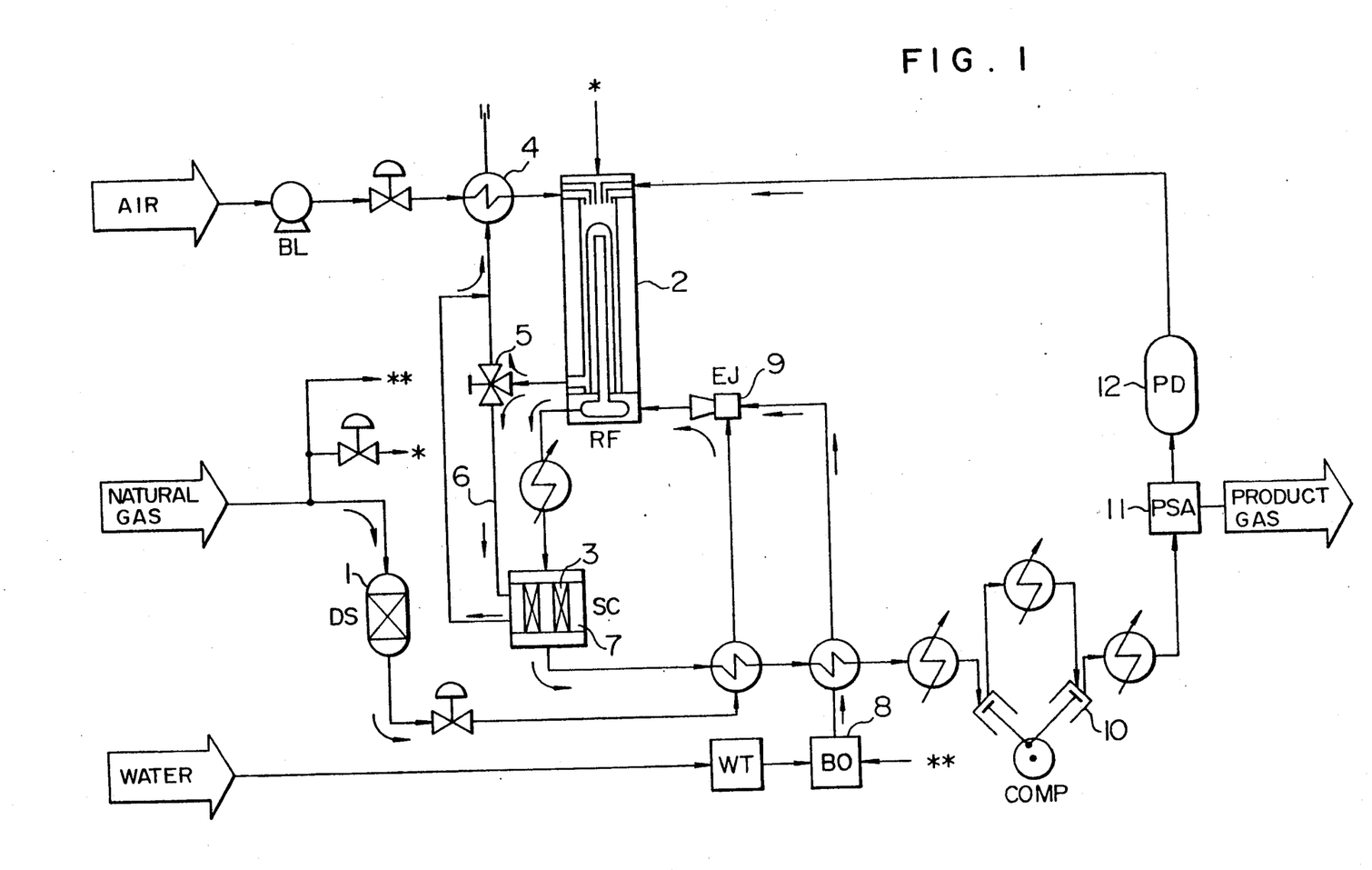
FIG. 1 is a diagram showing general arrangement of an on-site type hydrogen generating apparatus as an embodiment of the present invention.

Referring to FIG. 1, an embodiment of the hydrogen generating apparatus of the present invention has a material supply system including a desulfurization reactor 1 and a reforming system including a reformer 2 and a shift converter 3. The desulfurization reactor 1, the reformer 2 and the shift converter 3 incorporate catalysts, respectively. The hydrogen generating apparatus further has an air supply system including an air-preheating heat exchanger 4 in which heat is exchanged between the combustion gas exhausted from the reformer and the combustion air. Numeral 5 denotes a change-over valve which is adapted to be opened by air pressure and closed by being heated, as will be detailed later. Numeral 6 denotes a branch pipe having a branching point at which the change-over valve 5 is provided. The branch pipe 6 has a branch through which the combustion gas exhausted from the reformer combustion gas system is introduced into the shift converter 3. The shift converter 3 is surrounded by a shift converter jacket 7. The apparatus further has a boiler 8 serving as a steam generating means, an ejector 9, a compressor 10 as a boosting means, a pressure swing adsorption (PSA) 11 as refining means provided in a line for transporting the generated hydrogen, and a purged gas drum 12.

A natural gas such as a hydrocarbon gas ($CH_4$) is supplied as a fuel (material gas) to the reformer 2 and the boiler 8, as marked at     and     . The natural gas desulfurized in the desulfurization reactor 1 is mixed with and sucked by the steam generated by the boiler 8, by the operation of the ejector 9, so as to be used as the material which is to be reformed in the reformer 2.

The material reformed in the reformer 2 in accordance with the aforementioned formula (1) is CO converted by the shift converter 3 in accordance with the formula (2) and, after boosting by the compressor 10, refined in the PSA 11 and delivered as the product gas. Purge gas generated in the PSA 11 is introduced into the purge gas drum 12 which absorbs any pressure fluctuation, and is then used as the fuel to be burnt in the reformer.

The combustion gas generated as a result of combustion in the reformer 2 is made to exchange heat with the material flowing through the reforming catalyst layer so as to impart the heat necessary for the pre-heating of the material in the reformer catalyst layer, as well as heat necessary for the endothermic reaction, and is then exhausted as the combustion exhaust gas.

Thus, the combustion gas exhausted from the reformer 2 still holds a large heat energy. Therefore, in the steady operation of the apparatus, the combustion exhaust gas is discharged outside the apparatus through the air pre-heating heat exchanger 4 so as to discharge heat to pre-heat the combustion air. However, when the apparatus is being started up, the change-over valve 5 is so set as to cause the combustion gas exhausted from the reformer to flow into the branch pipe 6 leading to the shift converter 3 so as to flow through the shift converter jacket 7, thereby promoting heating up of the shift converter 3.

Thus, in the described embodiment of the present invention, the shift converter 3 can be heated up in a shorter time, without requiring power-consuming electric heater, by making an efficient use of the reformer combustion gas the temperature of switch rises comparatively quickly, whereby the whole apparatus can be started up in a shorter time than the case of the conventional apparatus. The gas from the shift converter jacket 7 is then made to pass through the air-preheating heat exchanger 4 so that the heat is further recovered even during start up of the apparatus.

Figure 2:
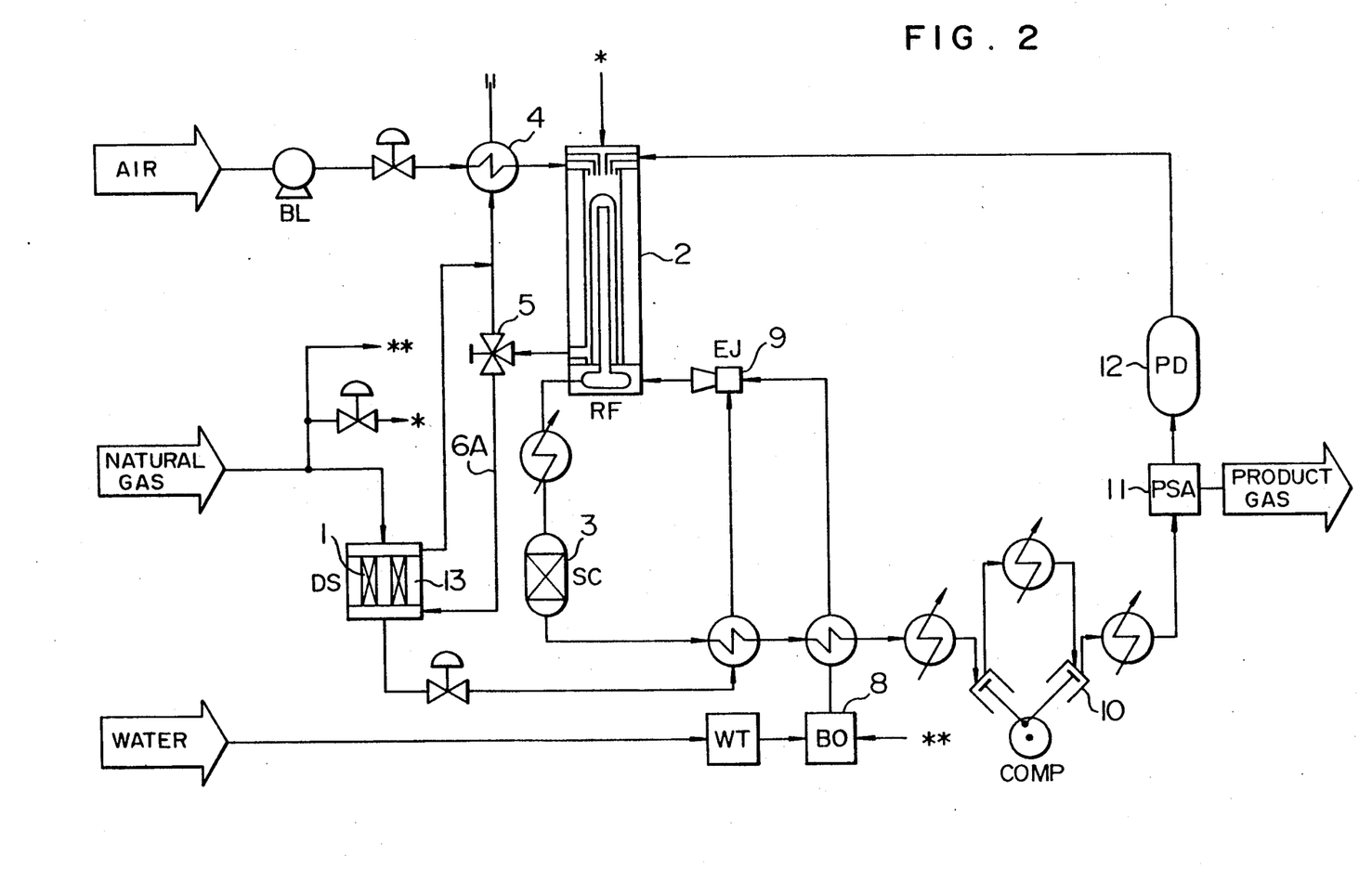
FIG. 2 is a diagram showing general arrangement of an on-site type hydrogen generating apparatus as another embodiment of the present invention.

FIG. 2 shows an on-site hydrogen generating apparatus as another embodiment of the present invention. In this Figure, the same reference numerals are used to denote the same parts or components as those in FIG. 1, and detailed description of such parts or components is omitted.

In the embodiment shown in FIG. 2, a branch pipe 6A of the gas system branching at the change-over valve 5 is introduced into a desulfurization reactor jacket 13 which surrounds the desulfurization reactor 1.

During starting up of the apparatus, the combustion gas exhausted from the reformer is introduced into the branch pipe 6A through the change-over valve 5 and flows through the desulfurization reactor jacket 13 thereby heating up the desulfurization reactor 1.

In this embodiment, the desulfurization reactor 1 can be heated up in a shorter time, without requiring power-consuming electric heater, by making an efficient use of the reformer combustion gas the temperature of switch rises comparatively quickly, whereby the whole apparatus can be started up in a shorter time than the case of the conventional apparatus. The gas from the desulfurization reactor jacket 13 is then made to pass through the air-preheating heat exchanger 4 so that the heat is further recovered even during start up of the apparatus.

Examples of the change-over valve will be described with reference to FIGS. 3A, 3B and 4A, 4B.

Figure 3A:
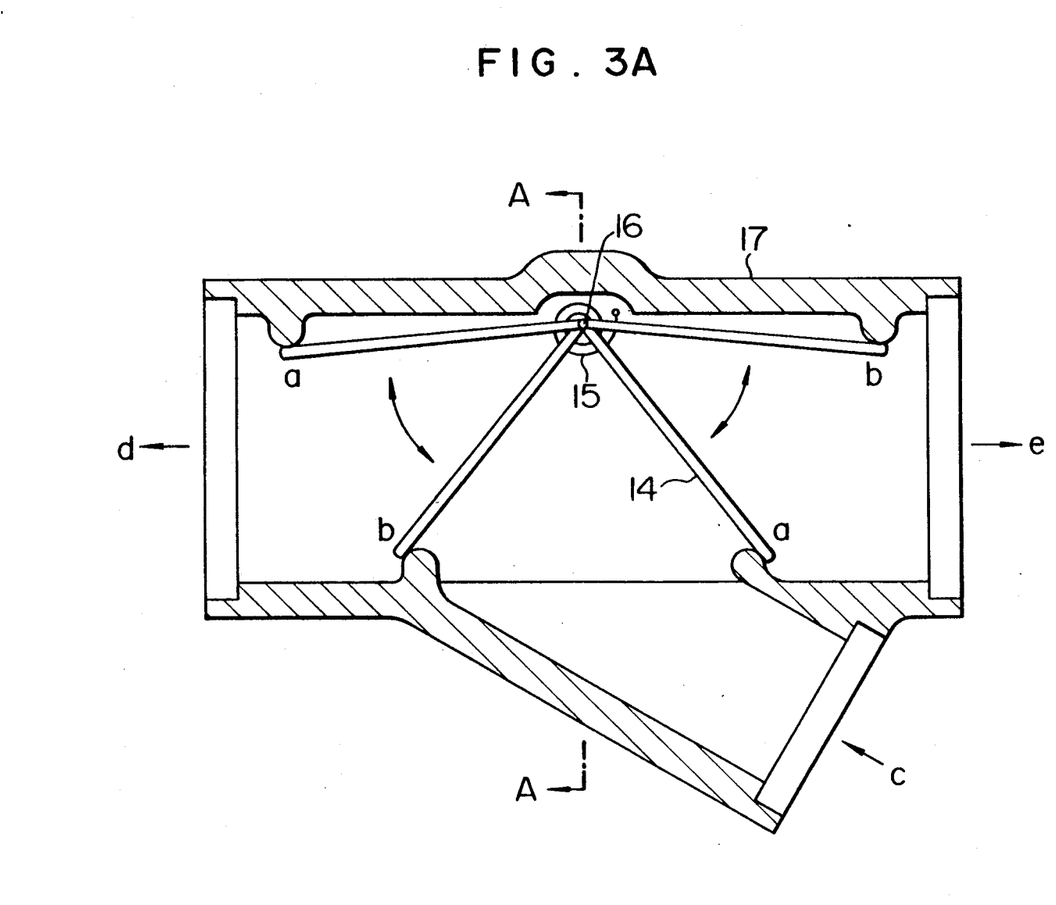
FIG. 3A is a sectional view of a change-over valve having an actuating mechanism incorporating a shape memory alloy member.
Figure 3B:
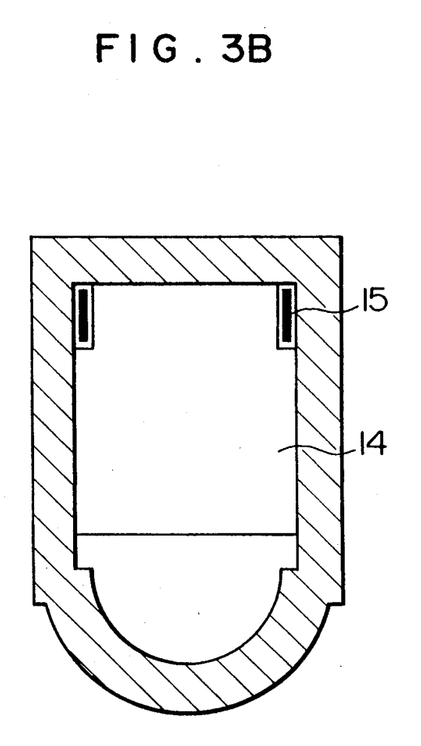
FIG. 3B is a sectional view taken along the line A—A of FIG. 3A.

Referring to FIGS. 3A and 3B, an example of the change-over valve 5 has a valve member 14 in the form of a valve plate of a hinged type. The change-over valve 5 also has a spring 15 which serves as a valve actuating member and which is made of a shape memory alloy. Numeral 16 denotes a shaft for supporting the valve plate 14, while 17 designates a valve box. The spring 15 made of shape memory alloy is adapted to restore its shape when a predetermined set temperature is reached, so as to activate the valve plate 14 in such a direction as to shut-off the flow of the combustion gas flowing in the direction of an arrow d.

When the hydrogen generating apparatus shown in FIG. 1 or the hydrogen generating apparatus shown in FIG. 2 is being started up, the spring 15 does not produce any effect so that the furnace purging air introduced into the valve 5 as indicated by an arrow c (from the reformer 2) forcibly opens the valve plate 14 and flows in the direction of the arrow d. Meanwhile, the valve plate 14 rests at a position indicated at a in FIG. 3A. The air flowing into the change-over valve 5 as indicated by the arrow c is progressively replaced with the reformer combustion gas the temperature of which progressively rises as the heat is accumulated in the reformer 2. This reformer combustion gas also flows in the direction of the arrow d, i.e., towards the shift converter jacket 7 in the case of the embodiment shown in FIG. 1 and towards the desulfurization reaction jacket 13 in the case of the embodiment shown in FIG. 2.

When the temperature of the combustion exhaust gas has reached a set temperature, the spring 15 made of shape memory alloy recovers its shape so as to force the valve plate 14 back to the position indicated by b in FIG. 3A, so that the combustion gas exhausted from the reformer 2 flows in the direction of an arrow e, i.e., towards the air-preheating heat exchanger.

Figures 4A, 4B:
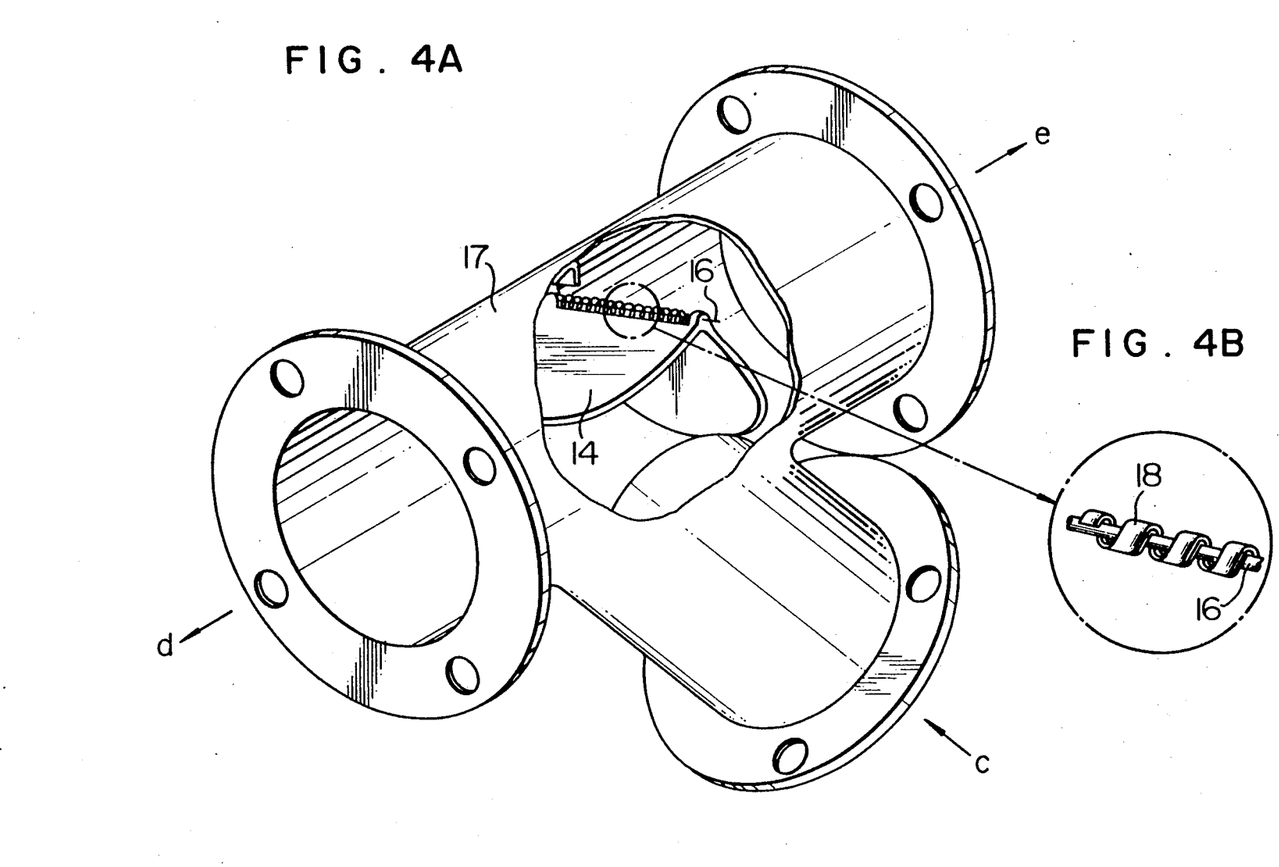
FIG. 4A is a sectional view of a change-over valve having an actuating mechanism incorporating a bimetal.
FIG. 4B is a perspective view of a critical portion of the valve shown in FIG. 4A.

FIGS. 4A is a partly cut-away perspective view of a portion of an example of the change-over valve which makes use of a bimetal, while FIG. 4B is a perspective view of a critical portion of this valve. In these Figures, the same reference numerals are used to denote the same parts or members as those shown in FIGS. 3A and 3B and detailed description of such parts or members are omitted.

In the change-over valve shown in FIGS. 4A and 4B, a spring 18 made of a bimetal is used as the actuator for actuating the valve plate 14.

When the hydrogen generating apparatus is being started up, the spring 18 made of bimetal does not produce any effect so that the furnace purging air introduced into the valve 5 as indicated by an arrow c (from the reformer) forcibly opens the valve plate 14 and flows in the direction of the arrow d. The air flowing into the change-over valve 5 as indicated by the arrow c is progressively replaced with the reformer combustion gas the temperature of which progressively rises as the heat is accumulated in the reformer 2. This reformer combustion gas also flows in the direction of the arrow d, i.e., towards the shift converter jacket 7 in the case of the embodiment shown in FIG. 1 and towards the desulfurization reaction jacket 13 in the case of the embodiment shown in FIG. 2.

When the temperature of the combustion exhaust gas has reached a set temperature, the spring 18 made of bimetal acts to force the valve plate 14 back to the position indicated by b in FIG. 3A, so that the combustion gas exhausted from the reformer 2 flows in the direction of an arrow e, i.e., so as to bypass the shift converter jacket 7 in the embodiment of FIG. 1 and the desulfurization reactor jacket 13 in FIG. 2, thereby preventing overheating of these components.

A description will now be given of still another embodiment in which the combustion exhaust gas is made to flow through the desulfurization reactor or the shift converter, with specific reference to FIG. 5.

Figure 5:
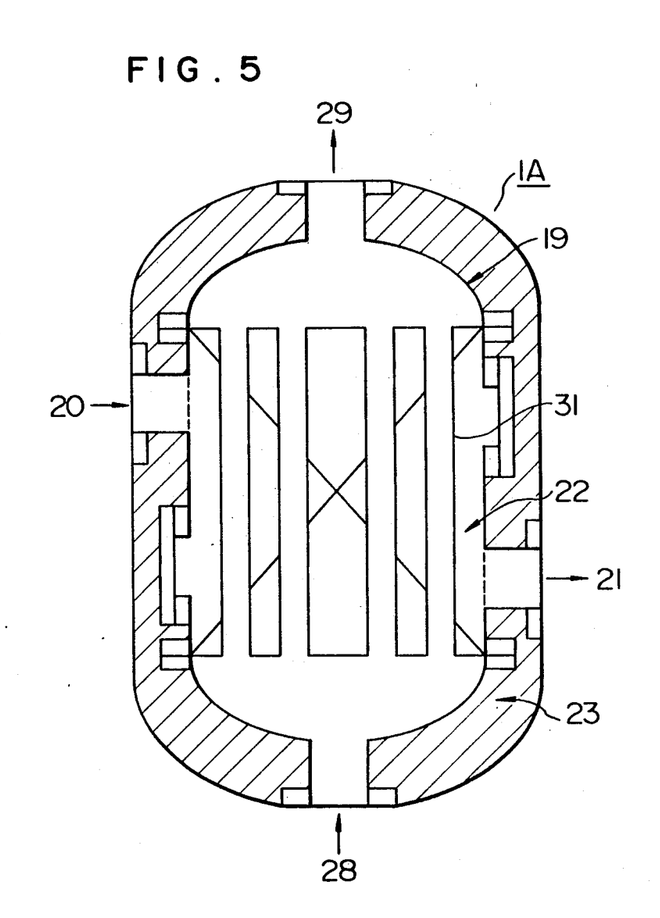
FIG. 5 is a schematic sectional view of a desulfurization reactor used in still another embodiment of the hydrogen generating apparatus of the present invention.

Referring to FIG. 5, the desulfurization reactor denoted by 1A has a tube nest extending through the catalyst layer, the tube nest serving as the passage for the reformer combustion gas in place of the jacket 13 used in the preceding embodiments.

More specifically, the desulfurization reactor 1A shown in FIG. 5 has a vessel 19, a process gas inlet 20, a process gas outlet 21, a desulfurization catalyst layer 22 represented by orthogonal oblique lines, a heat insulating member 23 surrounding the vessel 19, an inlet 28 for the combustion gas exhausted from the reformer, an outlet 29 for the combustion gas, and the tube nest 31 which extends through the catalyst layer 22. Thus, the desulfurization reactor 1A shown in FIG. 5 is a shell-and-tube type reactor with its shell side charged with the catalyst while the tube side provides a passage for the combustion gas.

Obviously, the construction explained in connection with FIG. 5 may be applied to the shift converter, although a desulfurization reactor has been specifically mentioned in connection with FIG. 5.

A description will now be given of a modification of the desulfurization reactor of combustion catalyst type, with specific reference to FIG. 6. In this Figure, the same reference numerals are used to denote the same parts or members as those used in FIG. 5.

Figure 6:
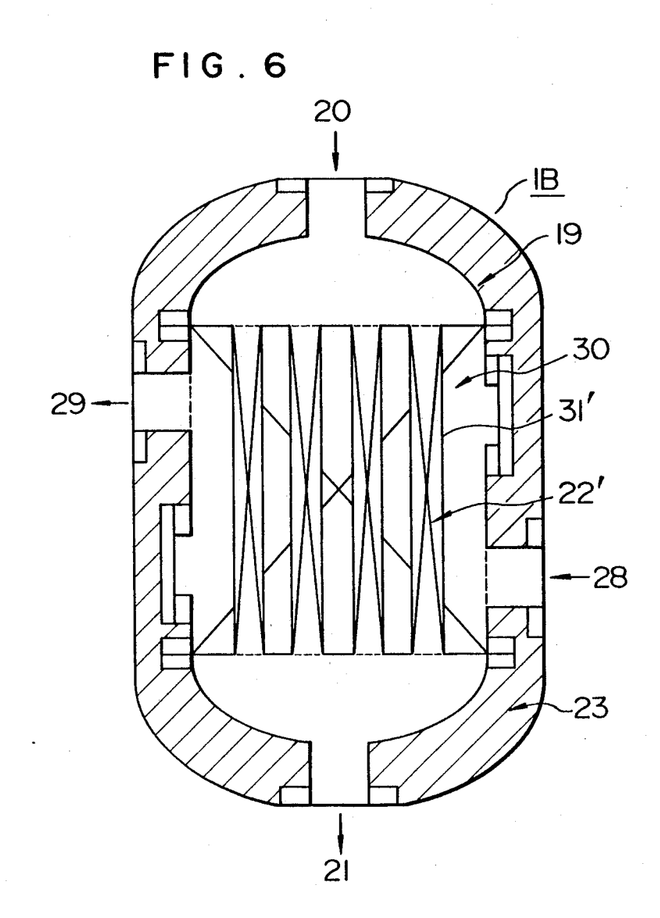
FIG. 6 is a schematic sectional view of a desulfurization reactor used in a further embodiment of the hydrogen generating apparatus of the present invention.

Referring to FIG. 6, the combustion catalyst type desulfurization reactor 1B has a tube nest 31', a desulfurization catalyst layer 22' charged in the space between the tubes of the tube nest 31', and a combustion catalyst 30 charged in the region surrounding the tube nest 31' as marked by orthogonal oblique lines. In this reactor, a fuel is mixed with the heating combustion gas from the reformer and the mixture is burnt in the presence of the combustion catalyst so that a greater heat is delivered to the process-side catalyst without using a burner.

In operation, the process gas is introduced through the inlet 20 and is made to pass through the desulfurization catalyst layer 22' charged in the space between the tubes of the tube nest 31' so as to be discharged from the outlet 21. The combustion catalyst 30 is charged so as to surround the desulfurization catalyst layer 22'. The combustion gas introduced through the inlet 28, still containing combustible gas, is burnt in the presence of the combustion catalyst 30 upon reaction with excess oxygen in the combustion gas, so as to deliver heat to the process-side catalyst, i.e., the desulfurization catalyst 22'. The gas then flows out of the reactor through the outlet 29. The vessel 19 is covered by the heat-insulating member 23. In order to develop a uniform temperature distribution over the entire region of the desulfurization catalyst 22', taking into account the radiation of heat from the vessel, it is preferred that the gap to be charged with the combustion catalyst 30 is made small at the core region and large at the peripheral region.

The desulfurization reactor 1B of the type shown in FIG. 6 is suitable in the case where the temperature of the combustion gas from the reformer does not rise quickly due to slow heat accumulation in the reformer in the beginning period of the start-up or where the heat possessed by the combustion gas exhausted from the reformer is too small to simultaneously heat up both the desulfurization reactor and the shift converter. It is, however, necessary that the timing of mixing of the fuel and the quantity of the fuel to be mixed are so determined that the temperature of the gas is lower than the natural firing temperature at the position where the fuel is mixed and, at the inlet to the combustion catalyst, the temperature is higher than the temperature of ignition in the presence of the combustion catalyst but lower than the melt-down temperatures of both catalysts.

A description will now be given of an embodiment in which an electric heater or a steam pipe is incorporated in the shift converter, with specific reference to FIGS. 7 and 8. In these Figures, the same reference numerals are used to denote the same parts or members as those appearing in FIG. 5.

Figure 7:
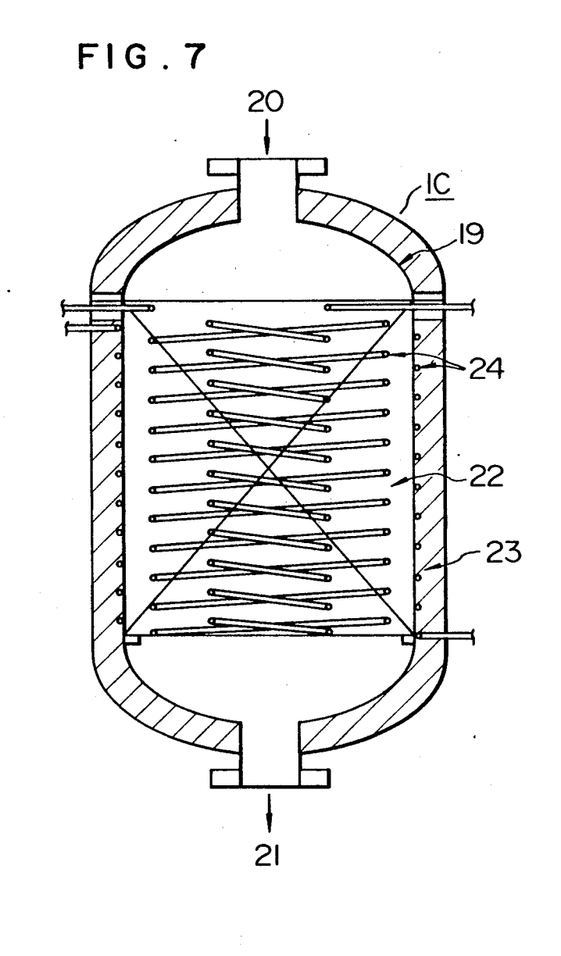
FIG. 7 is a schematic illustration of a desulfurization reactor having electric heaters at the core and outer peripheral parts of the catalyst layer.

Referring first to FIG. 7, a desulfurization reactor 1C has a vessel 19 which is provided with an inlet 20 and an outlet 21 for the process gas. Electric heater wires 24 are wound in the catalyst layer 22 formed in the vessel 19 and also on the outer surface of the vessel 19. The vessel 19 is then covered with a heat insulating member 23.

When the hydrogen generating apparatus is started up, the electric heater 24 in the catalyst layer 22 is operated to heat the desulfurization reactor 1C because in this case the nitrogen gas is made to flow at a small rate. However, after the start-up of the apparatus, combustible gas is supplied to the reactor so that the electric heater 24 in the catalyst layer 22 is turned off and the electric heater 24 on the outer surface of the vessel 19 is turned on to heat the reactor, in order to ensure safety. Preferably, the electric heater wire in the catalyst layer 22 is doubly wound although a single continuous heating wire is shown in FIG. 7 for the purpose of simplification of the drawings. In order to attain a uniform temperature rise in the core region of the catalyst layer, it is preferred that two independent heater wires are used, one for the central region and one for the peripheral region, so as to be controlled independently of each other. When a single heater wire is used, it is preferred that the heater wire is wound densely in the peripheral region and sparsely in the central region.

Figure 8:
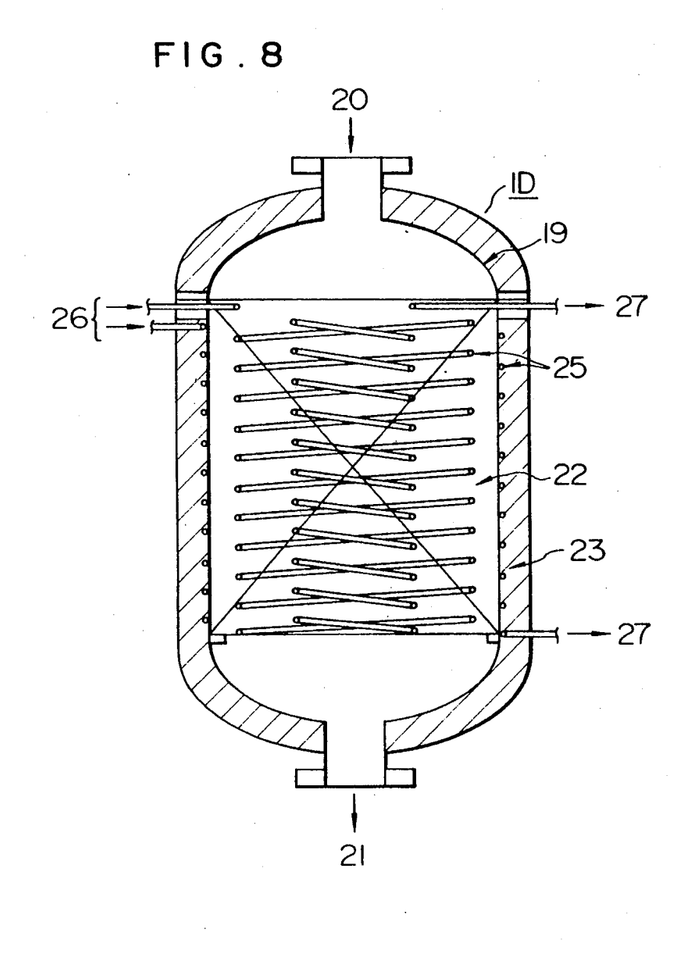
FIG. 8 is a schematic sectional view of a desulfurization reactor having steam pipes provided in the core and outer peripheral parts of the catalyst layer.

FIG. 8 shows a desulfurization reactor 1D which is basically the same as that shown in FIG. 7 except that the electric heater wires are substituted by steam pipes 25. In this case, therefore, the vessel 19 has a steam inlet 26 and a steam outlet 27. The use of steam, however, is not suitable for preserving the temperature of the reactor because the steam temperature cannot be raised to a level higher than the temperature of the catalyst layer 22 unless the steam is pressurized to a considerably high level.

Obviously, the electric heaters and the steam pipes explained in connection with FIGS. 7 and 8 can be applied to the shift converter, although the desulfurization reactor having simpler construction has been specifically mentioned.

Figure 9:
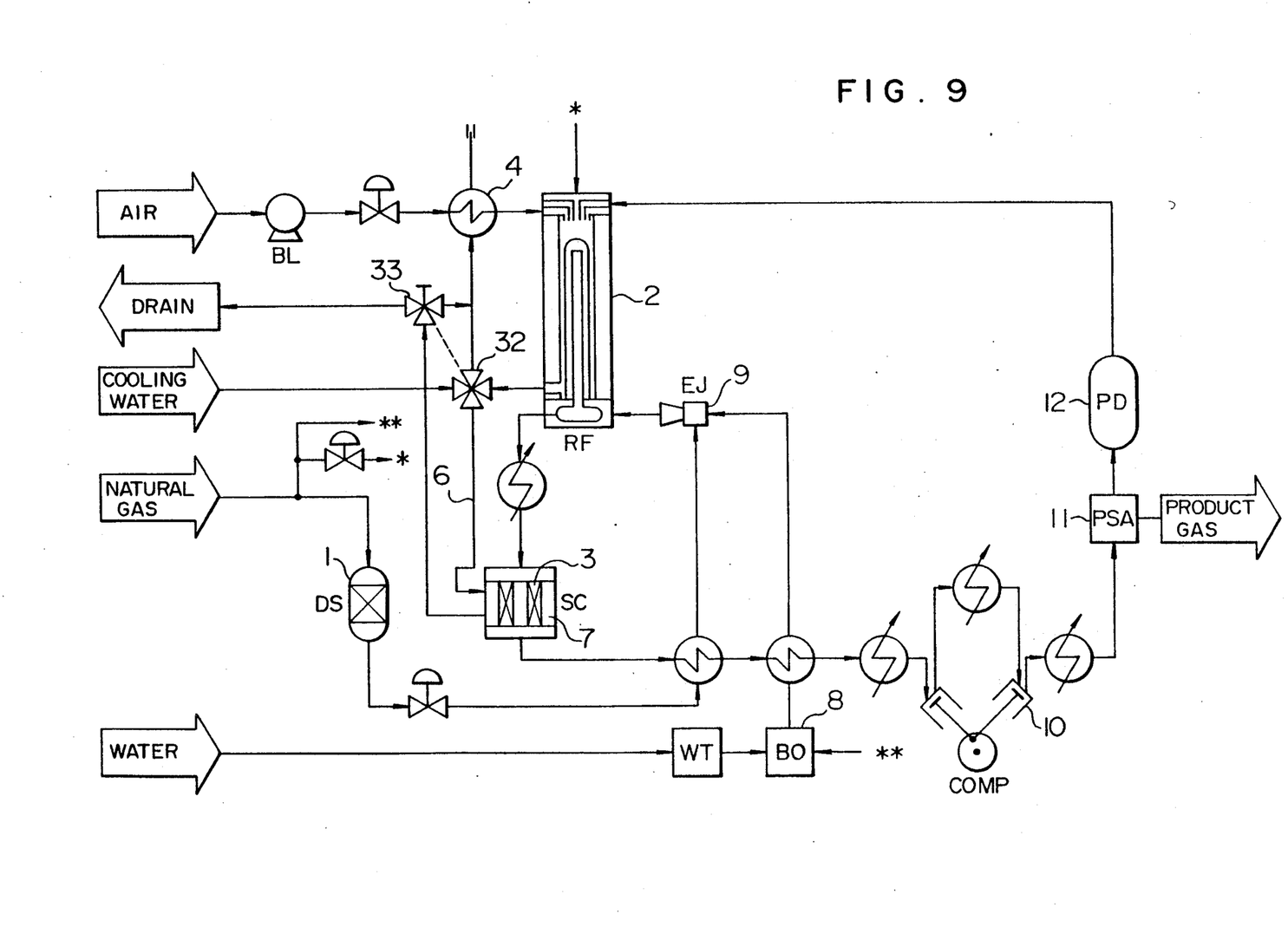
FIG. 9 is a diagram showing an on-site type hydrogen generating apparatus as a further embodiment of the present invention.

A description will now be given of a different embodiment shown in FIG. 9 in which a four-way valve is used as the change-over valve so as to enable the switching of the fluid to be supplied to the shift converter jacket between the combustion gas from the reformer and cooling water. In FIG. 9, the same reference numerals are used to denote the same parts or components as those appearing in FIG. 1 and detailed description of such parts or components is omitted.

In some cases, the hydrogen generating apparatus of the present invention is constructed to have only one stage of the shift converter 3 of low temperature, and the whole apparatus is packaged in a container. In such a case, the shift converter may be overheated due to too small radiation of heat to the air from the surface thereof. In order to overcome this problem, it is necessary to cool the shift converter 3 during operation of the apparatus. In the embodiment shown in FIG. 9, the cooling of the shift converter is conducted by using the shift converter jacket 7 which also is used for the heating purpose.

In this embodiment, a four-way valve 32 is used as the change-over valve which conducts switching between the branch pipe 6 for leading the reformer combustion gas to the shift converter jacket 7 and the passage leading to the air-preheating heat exchanger 4. A cooling water line is connected to the four-way valve 32 such that, when the four-way valve 32 is in the position for introducing the reformer combustion gas to the air-preheating heat exchanger 4, the branch pipe 6 is connected to the cooling water line so that the cooling water is introduced into the shift converter jacket 7. By providing a three-way valve 33 operatively connected to the four-way valve 32 at the downstream side of the shift converter jacket 7, it is possible to discharge the cooling water without allowing the same to enter the air-preheating heat exchanger 4.

In the embodiment shown in FIG. 9, it is necessary that the cooling water is warm water rather than cold water, for otherwise the shift converter 3 which has been heated is cooled excessively.

As has been described, the present invention provides a hydrogen generating apparatus which is improved to shorten the time required for starting up the whole reformer system by realizing quicker heat up of the shift converter and/or the desulfurization reactor.

What is claimed is:

1. A hydrogen generating apparatus comprising a reforming system including a reformer and a shift converter connected in series, each incorporating a catalyst, a material gas supply system for supplying a reactant gas to said reforming system, means for supplying a combustible gas to a combustion zone of said reformer, steam generating mean for supplying steam to said reforming system; an air supply system for supplying air to effect combustion of the combustible gas in the combusting zone to heat the catalyst in said reformer; a product hydrogen transporting system operatively associated with the reforming system for discharging product hydrogen from the apparatus and a reformer combustion gas exhaust system for discharging combustion gas from the reformer; said apparatus further comprising:
   a shift converter jacket surrounding the catalyst within said shift converter;
   a branch pipe branching from said reformer combustion gas exhaust system and leading to said shift converter jacket; and
   a change-over valve provided at a portion of said reformer combustion gas exhaust system where said branch pipe branches off from said reformer combustion gas exhaust system; said change-over valve comprising valve means for alternately changing over flow of reformer combustion exhaust gas between a flow in the direction of said reformer combustion gas exhaust system and a flow in the direction of said shift converter jacket so that said reformer combustion exhaust gas flows through said jacket.

2. A hydrogen generating apparatus according to claim 1, wherein said shift converter jacket comprises a tube nest extending through a layer of the catalyst within said shift converter.

3. A hydrogen generating apparatus according to claim 1, wherein said change-over valve comprises valve means including a valve plate for selectively opening and closing said branch pipe and a valve actuating mechanism incorporating a member made of a shape memory alloy and capable of urging said valve plate for closing said branch pipe.

4. A hydrogen generating apparatus according to claim 2, wherein said change-over valve comprises valve means including a valve plate for selectively opening and closing said branch pipe and a valve actuating mechanism incorporating a member made of a shape memory alloy and capable of urging said valve plate for closing said branch pipe.

5. A hydrogen generating apparatus according to claim 1, wherein said change-over valve comprises valve means including a valve plate for selectively opening and closing said branch pipe and a valve actuating mechanism incorporating a member made of a bimetal alloy and capable of urging said valve plate for closing said branch pipe.

6. A hydrogen generating apparatus according to claim 2, wherein said change-over valve comprises valve means including a valve plate for selectively opening and closing said branch pipe and a valve actuating mechanism incorporating a member made of a bimetal alloy and capable of urging said valve plate for closing said branch pipe.

7. A hydrogen generating apparatus comprising a reforming system including a reformer and a shift converter connected in series, each incorporating a catalyst; a material gas supply system for supplying reactant gas to said reforming system, means for supplying a combustible gas to a combustion zone of said reformer; said gas supply system including a desulfurization reactor incorporating a catalyst for treating the reactant gas prior to supplying the treated gas to said reforming system; steam generating means for supplying steam to said reforming system; an air supply system for supplying air to effect combustion of the combustible gas in the combustion zone to heat the catalyst in said reformer; a product hydrogen transporting system operatively associated with the reforming system for discharging hydrogen product from the apparatus; and a reformer combustion gas exhaust system for discharging a reformer combustion exhaust gas from the reformer; said apparatus further comprising:
   a desulfurization reactor jacket surrounding the catalyst within said desulfurization reactor;
   a branch pipe branching from said former combustion gas exhaust system and leading to said desulfurization reactor jacket; and
   a change-over valve provided at a portion of said reformer combustion gas exhaust system where said branch pipe branches off from said reformer combustion gas exhaust system; said change-over valve comprising valve means for alternately changing over flow of reformer combustion exhaust gas between a flow in the direction of said reformer combustion gas exhaust system and a flow in the direction of said desulfurization reactor jacket so that said reformer combustion gas passes through said jacket.

8. A hydrogen generating apparatus according to claim 7, wherein said desulfurization reactor jacket comprises a tube nest extending through a layer of said catalyst within said desulfurization reactor.

9. A hydrogen generating apparatus according to claim 7, wherein said change-over valve comprises valve means including a valve plate for selectively opening and closing said branch pipe and a valve actuating mechanism incorporating a member made of a shape memory alloy and capable of urging said valve plate for closing said branch pipe.

10. A hydrogen generating apparatus according to claim 8, wherein said change-over valve comprises valve means including a valve plate for selectively opening and closing said branch pipe and a valve actuating mechanism incorporating a member made of a shape memory alloy and capable of urging said valve plate for closing said branch pipe.

11. A hydrogen generating apparatus according to claim 7, wherein said change-over valve comprises valve means including a valve plate for selectively opening and closing said branch pipe and a valve actuating mechanism incorporating a member made of a bimetal alloy and capable of urging said valve plate for closing said branch pipe.

12. A hydrogen generating apparatus according to claim 8, wherein said change-over valve comprises valve means including a valve plate for selectively opening and closing said branch pipe and a valve actuating mechanism incorporating a member made of a bimetal alloy and capable of urging said valve plate for closing said branch pipe.

13. A hydrogen generating apparatus comprising a reforming system including a reformer and a shift converter connected in series, each incorporating a catalyst; a material gas supply system for supplying a reactant gas to said reforming system, means for supplying a combustible gas to a combustion zone of said reformer; a steam generating means for supplying steam to said reforming system; a gas supply system for supplying air to effect combustion of the combustible gas in the combustion zone to heat the catalyst in said reformer; a product hydrogen transporting system operatively associated with the reforming system for discharging hydrogen product from the apparatus; and a reformer combustion gas exhaust system for discharging reformer combustion exhaust gas from the reformer; said apparatus further comprising:
  a shift converter jacket surrounding the catalyst in said shift converter;
  a branch pipe branching from said reformer combustion gas exhaust system and leading to said shift converter jacket; and
  a change-over valve provided at a portion of said reformer combustion gas exhaust system where said branch pipe branches off from said reformer combustion gas exhaust system; said change-over valve comprising valve means alternately changing over flow of said reformer combustion exhaust gas between a flow in the direction of said reformer combustion gas exhaust system and a flow in the direction of said shift converter jacket so that the reformer combustion exhaust gas flows through said jacket; said change-over valve further comprising valve means connected to a cooling water line so that cooling water is introduced into said branch line when said change-over valve is switched to introduce the reformer combustion gas to a downstream side of said reformer combustion gas exhaust system.

14. A hydrogen generating apparatus according to claim 13, wherein said shift converter jacket comprises a tube nest extending through a layer of said catalyst within said shift converter.

15. A hydrogen generating apparatus according to claim 13, wherein said change-over valve comprises valve means including a valve plate for selectively opening and closing said branch pipe and a valve actuating mechanism incorporating a member made of a shape memory alloy and capable of urging said valve plate for closing said branch pipe.

16. A hydrogen generating apparatus according to claim 14, wherein said change-over valve comprises valve means including a valve plate for selectively opening and closing said branch pipe and a valve actuating mechanism incorporating a member made of a shape memory alloy and capable of urging said valve plate for closing said branch pipe.

17. A hydrogen generating apparatus according to claim 13, wherein said change-over valve comprises valve means including a valve plate for selectively opening and closing said branch pipe and a valve actuating mechanism incorporating a member made of a bimetal alloy and capable of urging said valve plate for closing said branch pipe.

18. A hydrogen generating apparatus according to claim 14, wherein said change-over valve comprises valve means including a valve plate for selectively opening and closing said branch pipe and a valve actuating mechanism incorporating a member made of a bimetal alloy and capable of urging said valve plate for closing said branch pipe.

* * * * *